US 9,667,549 B2

(12) United States Patent
Ziekow

(10) Patent No.: US 9,667,549 B2
(45) Date of Patent: May 30, 2017

(54) PROCESSING EVENT DATA STREAMS TO RECOGNIZE EVENT PATTERNS, WITH CONDITIONAL QUERY INSTANCE SHIFTING FOR LOAD BALANCING

(71) Applicant: AGT INTERNATIONAL GMBH, Zurich (CH)

(72) Inventor: Holger Ziekow, Frankfurt (DE)

(73) Assignee: AGT INTERNATIONAL GMBH, Zurich (CH)

(*) Notice: Subject to any disclaimer, the term of this patent is extended or adjusted under 35 U.S.C. 154(b) by 178 days.

(21) Appl. No.: 14/361,339

(22) PCT Filed: Nov. 27, 2012

(86) PCT No.: PCT/EP2012/073700
§ 371 (c)(1),
(2) Date: May 29, 2014

(87) PCT Pub. No.: WO2013/079472
PCT Pub. Date: Jun. 6, 2013

(65) Prior Publication Data
US 2014/0317287 A1 Oct. 23, 2014

(30) Foreign Application Priority Data
Nov. 29, 2011 (EP) .................... 11191227

(51) Int. Cl.
G06F 15/16 (2006.01)
H04L 12/803 (2013.01)
(Continued)

(52) U.S. Cl.
CPC ......... *H04L 47/125* (2013.01); *G08G 1/0133* (2013.01); *H04L 41/145* (2013.01)

(58) Field of Classification Search
CPC .............................. H04L 47/125; H04L 4/145
See application file for complete search history.

(56) References Cited

U.S. PATENT DOCUMENTS 7,389,178 B2 * 6/2008 Raz .................... G07C 5/085
340/903
8,594,838 B2 * 11/2013 Selker ................ G06Q 30/0251
700/232
(Continued)

FOREIGN PATENT DOCUMENTS

EP 233714 6/2011

OTHER PUBLICATIONS

EP Search Report from EP 2600326 dated Jul. 5, 2012.
Inetrnational Search Report together with Written Opinion from PCT/EP2012/073700 dated Feb. 6, 2014.

*Primary Examiner* — Moustafa M Meky
(74) *Attorney, Agent, or Firm* — Browdy and Neimark, PLLC

(57) ABSTRACT

A computer (100) recognizes an event pattern (ABC) for objects (14, 24, 34, 44) that belong to an event domain (150). The computer activates a pattern query (110) that corresponds to the event pattern (ABC) and that has a least one state (S4) with an distinctive transition probability to a final state. The probability is derived from object observations in the event domain (150). The computer continuously receives event representations (*A14, *A24, *A44, *D44, . . . ) that are related to the objects (14, 24, 34, 44) and allocates the event representations to a first processing resource (101) to initiate instances (1.14, 1.24, 1.34, 1.44) of the query (110). It monitors the instances and, upon receiving event representations that cause the instances to reach the state (S4) with the distinct transition probability, it shifts the instances to a second processing resource (102).

17 Claims, 6 Drawing Sheets

(51) Int. Cl.
*G08G 1/01* (2006.01)
*H04L 12/24* (2006.01)

(56) References Cited

U.S. PATENT DOCUMENTS

| | | | |
|---|---|---|---|
| 8,957,966 B2 * | 2/2015 | Loubser | G06K 9/00771 |
| | | | 348/143 |
| 2003/0041159 A1 | 2/2003 | Tinsley et al. | |
| 2005/0131597 A1 * | 6/2005 | Raz | G09B 19/167 |
| | | | 701/29.1 |
| 2007/0223818 A1 * | 9/2007 | Marik | G06K 9/00664 |
| | | | 382/218 |
| 2009/0076981 A1 | 3/2009 | Schonberg | |
| 2010/0057663 A1 | 3/2010 | Srinivasan et al. | |
| 2011/0144801 A1 * | 6/2011 | Selker | G06Q 30/0251 |
| | | | 700/231 |

* cited by examiner

PROCESSING EVENT DATA STREAMS TO RECOGNIZE EVENT PATTERNS, WITH CONDITIONAL QUERY INSTANCE SHIFTING FOR LOAD BALANCING

CROSS-REFERENCE TO RELATED APPLICATIONS

This application is a National Phase Application of PCT International Application No. PCT/EP2012/073700, International Filing Date Nov. 27, 2012, claiming priority of EP patent application Ser. No. 11191227.5, filed Nov. 29, 2011, which are hereby incorporated by reference.

TECHNICAL FIELD

The description generally relates to computer data processing, and more in particular relates to methods, computer program products and systems for processing data from data streams.

BACKGROUND

There are many areas such as road traffic, production processes, the environment, and others in that sensors such as cameras, microphones, fire detectors or the like are used for monitoring and security surveillance.

The sensors detect events in relation to objects, such as vehicles passing certain spots, persons using public transportation, calls to emergency phone numbers, etc. The data that represents the events can have different forms, such as data files with photos (of the vehicles or persons) or video sequences, data blocks, etc. There is usually a limited amount of data per event that can be related to the event.

Due to a high number of events, 1000, or 1.0000.000 or much more events per second, the event data can only be processed by computers. Especially helpful are computers that perform complex event processing to recognize event patterns or complex events, recurring and expected activities by objects, and—potentially of more interest for security reasons—unexpected activities and deviations from rules.

For example, for vehicles that move along a standard trajectory passing a number of spots, the traffic density can be calculated and traffic congestions can be anticipated. In case a vehicle moves around some areas at unusual times, for example moves around a sports stadium at night, such a pattern should be reported immediately to police for taking precautionary action.

Looking at the data from the sensors, it can be temporarily or permanently stored in databases so that queries can identify the patterns; for real-time pattern recognition it is more suitable to process data-streams immediately.

However, real-time pattern recognition from data-streams is not free of technical constraints; it requires computer resources, such as processors or CPUs and memory resources to be scalable and protected against overload.

There are techniques available to adapt or re-write data queries for use with data-streams, for example, by reducing the number of operators in a query. But once queries are instantiated, the instances load the mentioned resources for a period of time until events are recognized or until the recognition of events becomes no longer possible.

SUMMARY

A computer-implemented method for recognizing an event pattern for objects hat belong to an event domain comprises activating a pattern query that corresponds to the event pattern and that has a least one state with a distinctive transition probability to the final state of the query. The probability is derived from object observations in the event domain. Further, the method comprises continuously receiving event representations that are related to the objects, allocating the event representations to a first processing resource to initiate instances of the query; monitoring the instances and, upon receiving event representations that cause the instances to reach the state with the distinctive transition probability, shifting the instances to a second processing resource. Conditional shifting allows load balancing of the resources, especially with these query instances for that event recognition is likely to fail.

In an implementation, the query is activated such that the state with the distinctive transition probability is not associated with the event pattern.

In a further implementation, the activating step is performed such that the query has states and event-driven state transitions. The transition probabilities to a final state of the query classify the states into a first group of states and a second group of states. The transition probabilities are derived from object observations in the event domain. The second group has the at least one state with the distinctive state transition probability. The receiving step is performed for event representations with object identifiers. The allocating step is performed such that the event representations are allocated separately for different object identifiers. The monitoring step is performed such that the instances are monitored according to the classification of the states, so that instances that reach states of the first group continue to be executed by the first processing resource.

In a further implementation, the method is applied to objects that interact with sensors in the event domain so that the event representations are received from the sensors.

In a further implementation, the method is applied to sensors that submit representations (time stamps) of the event time.

In a further implementation, executing the instances stops upon reaching a maximum time.

In a further implementation, in step monitoring, the shifted instances are monitored according to the classification of the states. Previously shifted instances that reach states of the first group, are re-shifted to the first processing resource.

In a further implementation, the query is activated in combination with an event relation model in that most of the transition probabilities for a state that belongs to the first group to a state that belongs to the second group are different than the transition probabilities for the state that belongs to the second group to the states that belongs to the first group.

In a further implementation, in step receiving event representations, transition probabilities re-calculate and states and re-classified into groups. The monitoring step is performed with these re-classified states.

In a further aspect, the computer program product that—when loaded into a memory of a computing device and being executed by at least one processor of the computing device—performs the steps of the computer-implemented method.

In a further aspect, a computer recognizes an event pattern for objects that belong to an event domain. The computer comprises a pattern query activator that corresponds to the event pattern and that activates a pattern query that has at least one state with a distinctive transition probability. The probability is derived from object observations in the event domain. A receiver continuously receives event representations that are related to the objects. An allocator allocates the event representations to a first processing resource of the computer to initiate instances of the query; and a monitor monitors the instances and, upon receiving event representations that causes the instances to reach the state with the distinctive transition probability and shifts the instances to a second processing resource of the computer.

In a further implementation of the computer, the pattern query activator activates a query in that the state with the distinctive transition probability is not associated with the event pattern.

In a further implementation of the computer, the pattern query activator uses queries with states and event-driven state transitions. The transition probabilities to a final state of the query classify the states into a first group of states and a second group of states. The transition probabilities are derived from object observations in the event domain, and the second group has the at least one state with the distinctive state transition probability. The receiver receives the event representations with object identifiers. The allocator allocates the event representations separately for different object identifiers and the monitor monitors the instances according to the classification of the states, so that instances that reach states of the first group continue to be executed by the first processing resource.

In a further implementation of the computer, the receiver re-calculates transition probabilities and re-classifies the states into groups.

SHORT DESCRIPTION OF THE DRAWINGS

DETAILED DESCRIPTION OF THE DRAWINGS

Figure 1:
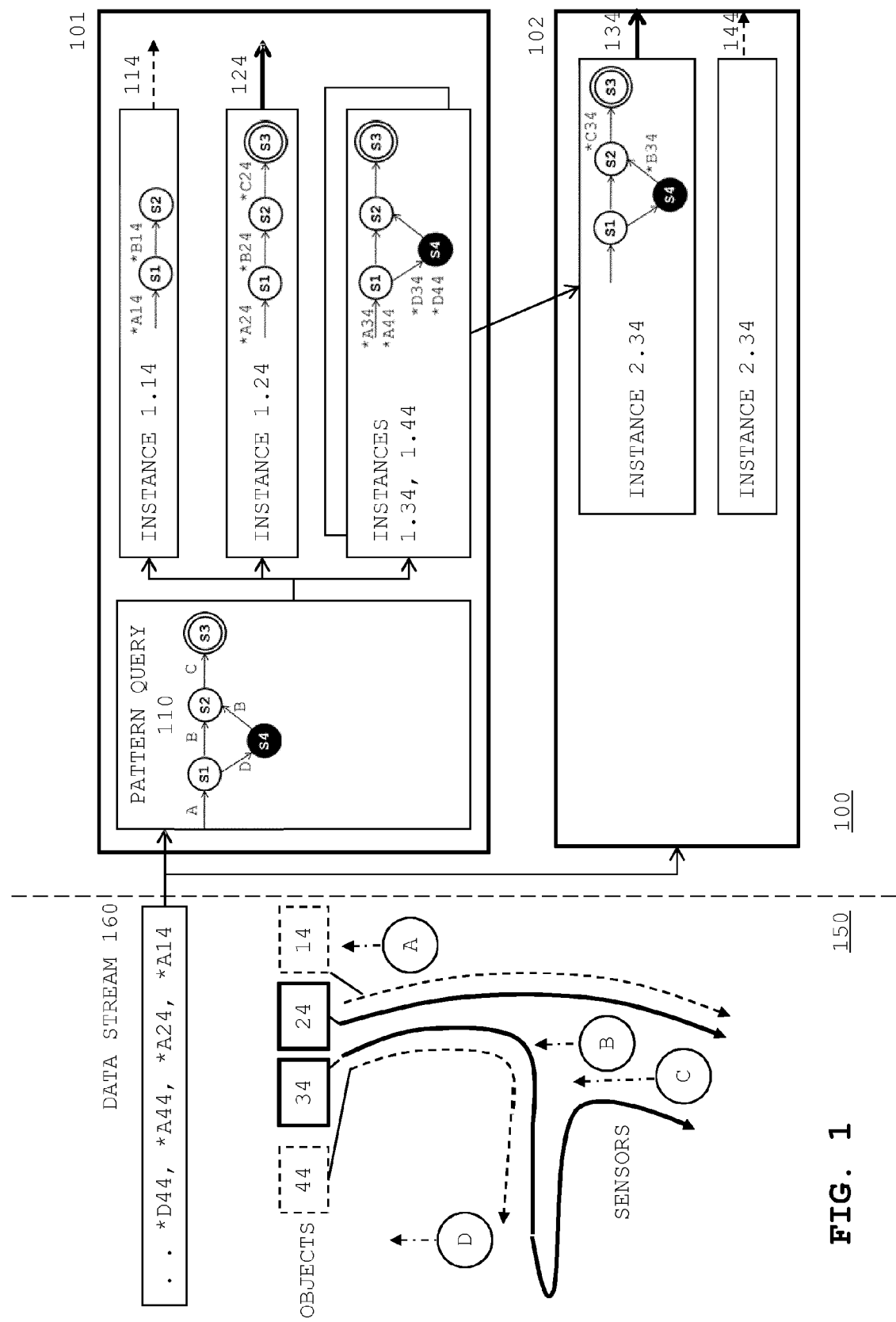
FIG. 1 is a simplified block diagram of an event domain and a computer.

FIG. 1 is a simplified block diagram of event domain 150 and computer 100. A vertical dashed line splits the figure into a left side (domain, e.g., sensor network) and a right side (computer).

Looking at the left side, exemplary sensors A, B, C and D may monitor road traffic and detect exemplary vehicles 14, 24, 34 and 44 passing by. In the example, the sensors can be physically located in proximity of the road (e.g., below or above the road) so that they have fixed geographic positions. Sensors A, B, and C are located inside the same geographic zone. Sensor D can be located in that zone or outside. In the example, vehicle 14 and 24 go from A, B to C in that order; vehicle goes 34 from A, via D and B to C; and vehicle 44 goes from A to D only.

In the example, computer 100 recognizes an event pattern (ABC) that is related to the vehicles. Simplified, a vehicle must pass sensor A, B and C in that order within a given time interval (e.g., Tmax=60 minutes). Vehicles 24 and 34 (bold solid trajectories) comply with that pattern; vehicles 14 and 44 (thin, dashed) do not comply.

Shortly looking at the right side, computer 100 provides output signals 114, 124, 134, and 144 that correspond to that results, for convenience the signals are illustrated like the trajectories.

Computer 100 activates query 110 and calculates the results in query instances that are conditionally shifted between processing resources 101 and 102. The term "resource" refers to computer hardware that is needed, such as one or more processors, main memory, storage, data buses and/or interfaces. For example, resources 101 and 102 can be separate memory portions, resources 101 and 102 can be separate processors (or processor kernels, or CPUs), resources 101 and 102 can be separate computers in a computer system, and resources 101 and 102 can be separate portions in a "computer cloud" or the like.

Back to the left side, the description goes on with more details. In the following, data representations of vehicles (or "objects" more in general), sensors and events are given with an asterisk at the left side.

Upon detecting a vehicle, each sensor (A, B, C, D etc.) submits the event representation (or event data), for example: an identifier of the sensor, for example, sensor-ID as illustrated by uppercase letters *A, *B, *C and *D; an identifier of a detected vehicle by a vehicle-specific identification number (object ID), for example as illustrated by Arabic numbers *14, *24, *34, *44; a time stamp *t indicating the time point t of the detection, for example, with hour (0 h, 1 h, . . . 23 h) and minutes (0 m, 1 m, . . . 59 m). For simplicity, in the example of FIG. 1, the events are instantaneous events for that the duration of events is not considered, but implementations can use the start time of an event, or an end time of the event, or combinations (average time) into account.

Event data can be given as data-stream 160 that is a sequence of event representations, for example with sensor-ID, vehicle-OD and time-stamp:

*A14 0 h 03 m
*A24 0 h 10 m
*A44 0 h 12 m
*D44 0 h 18 m
*B09 0 h 19 m
*A34 0 h 20 m
*B08 0 h 30 m
*B24 0 h 40 m
*D34 0 h 41 m
*C24 0 h 45 m
*A03 0 h 49 m
*B14 0 h 49 m
*B05 0 h 51 m
*B02 0 h 52 m
*A07 0 h 54 m
*B34 0 h 55 m
*B07 1 h 01 m
*C14 1 h 07 m
*C34 1 h 09 m

Two sensors can detect a vehicle at the same time point, for example, at time point t=0 h 49, both sensors A and B detect vehicles (13, 14)

The sensors submit the event data to the computing resources 101/102 (processors/memory) of computer 100 in form of data-stream 160. For simplicity it is assumed that the event data arrives at the processors in an order that corresponds to the time points t (hence, time stamps *t). For convenience of explanation, signal propagation delays inside and outside computer 100 are neglected.

The figure illustrates data-stream 160 slightly simplified as a first-in-first-out (FIFO) buffer with *A14 being the first-in event representation shown at the output of the buffer.

Looking at events, fast moving vehicle 24 (bold line) passes sensor A at to =0 h 10 m, passes sensor B at tB=0 h 40 m, and passes sensor C at tC=0 h 45 m, so that it takes T24=35 minutes to go from A to C. Vehicle 14 (dashed line) is slowly moving but passes all sensors as well. Vehicle needs T14=1 hour and 3 minutes. Fast moving vehicle 34 (bold line) passes A, D, B and C. Vehicle 44 (dashed line) passes sensors A and D.

In the example, sensors A, B and C could be located at a motorway. Vehicles (24, 34) that go from A, B to C within the given time interval (complying pattern) contribute to traffic density at the motorway. A traffic density could be calculated. Sensor D could be located at a road leading to a sports facility. The example events occur around midnight (cf. time stamps with 0 h), not much visitors are expected to go there. As a side-effect, the vehicles (14, 44) showing a non-complying pattern might be reported to security authorities so see who is visiting a sports facility at night.

In the example, an above mentioned event pattern should be defined to detect situations of interest, for example, to detect when event data meet all of the following conditions:
(1) at time point t1, sensor A has detected a vehicle having an object ID
(2) at time point t2, later than t1, sensor B has detected the vehicle with the same object ID
(3) at time point t3, later than t2, sensor C has detected the vehicle with the same object ID
(4) the time points tA, tB and tC are within 60 minutes (T=tC−tA; Tmax=60 min).

A conventional pattern query for being processed by a computer could be defined so that for every new vehicle representation, a new instance is created that does the following:
(1) sets a state S1="active" when receiving an event representation *A (from sensor A, having an object ID)
(2) sets a state S2="active" when receiving an event representation *B (from sensor B, same object ID; when being in state S1 )
(3) sets a state S3="active" when receiving an event representation *C (from sensor C, same object ID; when being in state S2 )
(4) on transitioning into S3, outputs a result "pattern recognized" if tC and tA falls within 60 minutes, or otherwise terminates without further processing if the time has progressed to t=tA+Tmax In the conventional query, states S1, S2 and S3 can be reached consecutively: S1 is the predecessor of S2; and S2 is the predecessor of S3. (This conventional query is illustrated as part of query 110). To stay with the vehicle example, for the instance of vehicle 24 (representation *24), the states would consecutively advance from S1 to S2 to S3 (pattern recognized); for vehicle 14 (representation *14), the states would consecutively advance from S1 to S2 only, because the time would run out.

However, keeping states for each representation applies load to the resources, for example, in terms of processor usage (computational efforts) and memory spending.

To deal with that situation, instances are conditionally shifted between resources. As a result, the load can be balanced among the resources. The description starts to explain the conditions by again looking at the event data stream: There are only few occurrences of events reported from sensor D. This is an observation concerning the relation between the events. For vehicle 44 , the patterns query would set an instance to state S1 =active for the event from sensor A, but that instance would remain at that state S1 and would consumes resources.

There is a further observation: State transitions occur with different probabilities. The probabilities correspond to vehicle traffic (in event domain 150, left side of the figure) that can be monitored: After passing sensor A, some vehicles turn into the direction of sensors B and C, some others turn into the direction of sensor D. Some vehicles go from B to D, some from D to B.

In the approach, query 110 does more (than a conventional query): it uses a further state S4 that is reached by events from sensor D but that is not related with the query pattern (ABC). The description will take an excurse to explain query 110 by the following figure, but will return to FIG. 1 shortly.

Figure 2:
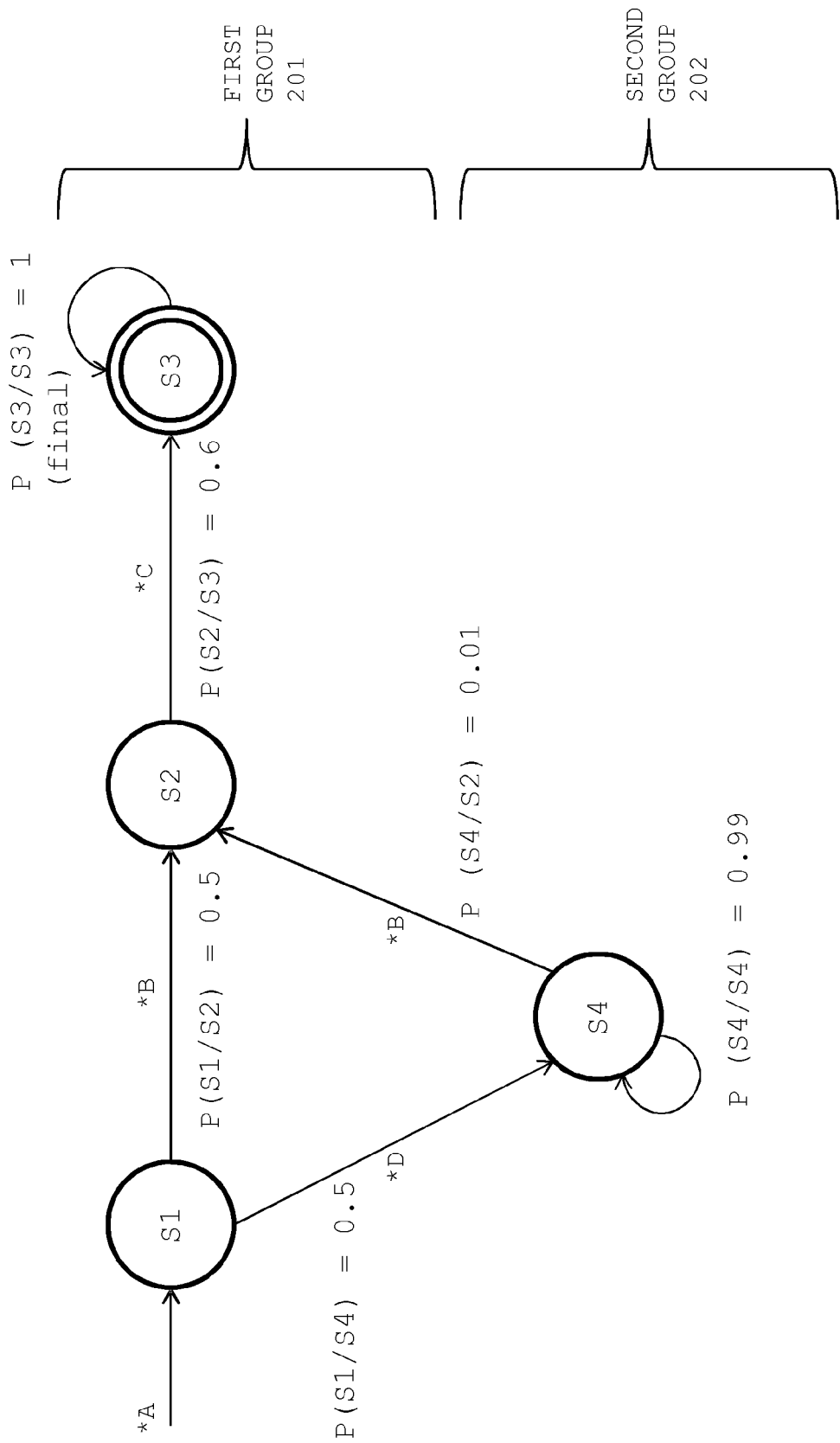
FIG. 2 is a state transition model of an exemplary pattern query with indication of state transition probabilities.

FIG. 2 is a state transition model of exemplary pattern query 210 (cf. 110 in FIG. 1), with indication of state transition probabilities.

Query 210 has query states S1, S2, S3 and S4 (illustrated by notes) and state transitions S1/S2, S2/S3, S1/S4, and S4/S2 (illustrated by edges/arrows). State transitions are driven by events (or rather event representations). As illustrated above the arrows or left to the arrows, event representation*A leads to state S1 (the query is initiated to an instance), *B leads to state S2 (transition S1/S2 and S4/S2), C leads to state S3 (final state), and *D leads to state S4.

Exemplary transition probabilities are P(S1/S4)=0.5; P(S1/S2)=0.5; P(S2/S3)=0.6 and P(S4/S2)=0.01. The transition probabilities correspond to observations in the event domain (e.g., to the traffic).

Figure 3:
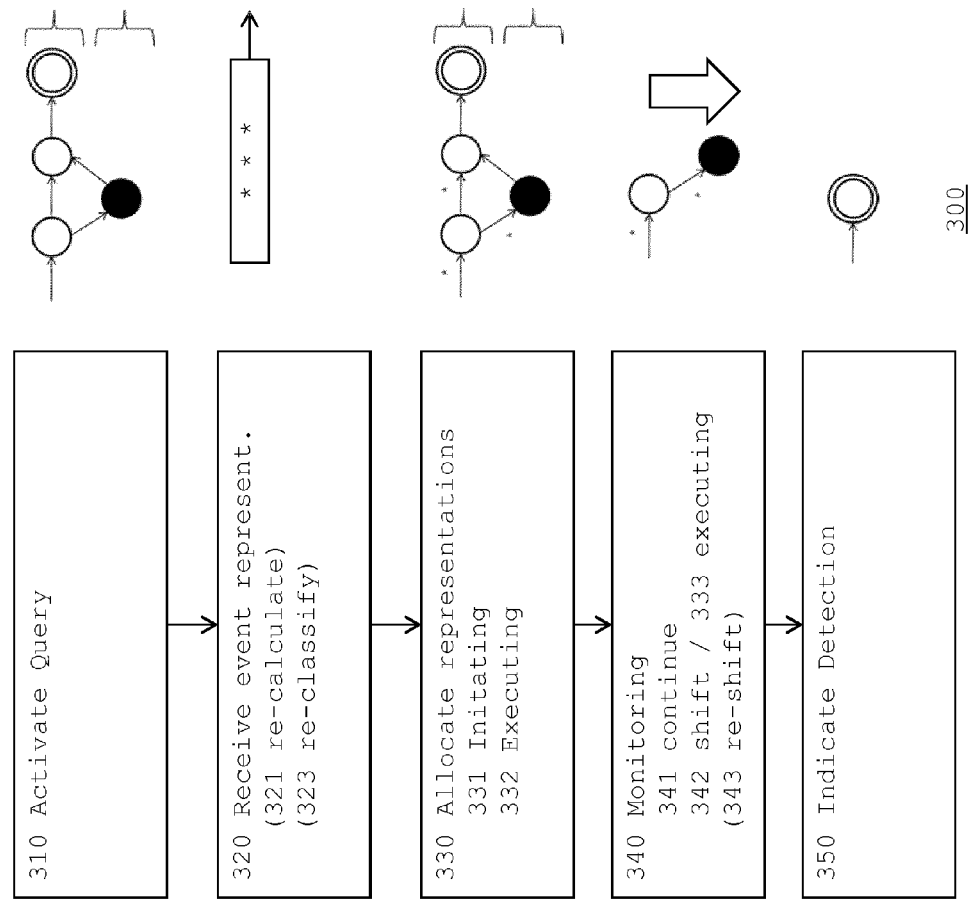
FIG. 3 is a flowchart diagram of a method that is performed by a computer system.

Transitions can lead to a final state of the query. In the example of FIG. 3, there is only one final state: state S3 (double-circle symbol). There are states that transit to the final state via intermediate states. For example, S1 transits to S3 via S2 (or via S4 and S3); S4 transits to S3 via S2. A direct transition is also possible. In the example, S2 transits to the final state (S3) directly, without an intermediate state.

For each state, a transition probability to the final state (S3) could be established by taking the probabilities of intermediate states into account. For example, probabilities of intermediate state are taken into account multiplicatively.

The transition probabilities a the final state (here to the single final state S3) classify the states into first group 201 and second group 202. In the example, states S1 and S2 (and final S3) belong to group 201, while state S4 belongs to group 202 because the probability to leave S4 is low (P=0.01) in comparison to the leave-probabilities of the other states. In other words, state S4 has a high remain-probability (i.e. P (S4/S4)=1−0.01=0.99.) Or, more in general, state S4 has a distinctive transition probability. In the example, the distinctive transition probability is a very low transition probability. The transition probability of S4 to the final state S3 is a combination of (P(S4/S2) and P(S2/S3), that is 0.01 multiplied with 0.6.

The distinctive transition probability to the final state could also be defined as a relatively low (or relatively high) probability in comparison to the to-final probabilities of the other non-final states.

More in general, a distinctive transition probability to the final state is a probability that is different (lower, or higher) than the other transition probabilities to that final state.

In the example of query 210, transition probabilities are shown between the individual states; but transition probabilities can also be defined between non-final states (e.g., S1, S2, S4) and the final state (e.g., S3). In that respect, each non-final state has a transition probability to the final state (e.g., S3), that is the query matching probability. (In a different example with different query structures, query instances might transition back and forth between states, but there might be a low probability to reach the final state.)

For convenience of explanation, the description uses states, state transitions in a state-machine metaphor; queries and instances with states can be implemented in a variety of ways, such as program routines (with "if then else" statements; logical engines), event processing networks, production rules, content-based publish subscribe, deterministic finite state automata, non-finite state automata or the like.

In view of the observations of the probabilities, the pattern queries have states with low and high probabilities, and instances are executed by different resources depending on the states that are reached at run-time. For further details, the description now returns to FIG. 1.

In the example, pattern query 110 (for being processed by computer 100 as instance)—similar to the above explained query—sets a state S1 ="active" for event representations *A from sensor A, sets state S2 ="active" for *B, and sets state S3 ="active" for *C, and outputs a result "pattern recognized" if tC and tA falls within 60 minutes (or terminates otherwise). Query 110 also comprises state S4 that is reached upon receiving a representation *D from sensor D. S4 has a relatively low leave-probability (P=0.01 to S2). Instances that reach S4 are shifted to a different resource, in the example, from resource 101 to resource 102.

For example, representation *A14 initiates instance 1.14 to state S1 that is executed by resource 101; representation *B14 (for the same vehicle, different sensor) leads to state S2. Instance 1.14 stays in resource 101 (and consumes, for example, memory) until Tmax=60 minutes are over (from *tA=0 h 03 m). Optionally, signal 114 indicates that no pattern was recognized (for vehicle 14), in other words, the pattern recognition failed.

For example, representation *A24 initiates instance 1.24 to state S1 that is also executed by resource 101; representation *B14 leads to state S2 ; and representation *C24 leads to S3 that is the final state. The 60 minutes have not yet elapsed, so that the instance indicates the recognition of the pattern (signal 124). The instance stays in resource 101 for approximately 35 minutes (*tC–*tA).

The execution of instances 1.14 and 1.24 is similar to the execution of the above mentioned conventional queries. The next 2 examples show the difference. Vehicles 34 and 44 pass sensor D; and for events in relation to that sensor, the query is specially adapted. As explained in connection with FIG. 2, the leave-probability of state S4 is low. (There are only few vehicles moving from D to B)

For example, representation *A34 initiates instances 1.34 to state S1 , but *D34 leads to state S4. (Vehicle 34 has moved to D). The state transitions happen within 21 minutes (*tD–*tA). S4 belongs to the second group (202 in FIG. 1) and the likelihood that instance 1.34 returns to S2 is 0.01. Therefore, instance 1.34 is shifted from resource 101 to resource 102. As a consequence, the instance 1.34 no longer uses the resource. This is different from instance 1.14 that remained in resource 101 over the full time. For convenience, the shifted instance is now referred to as instance 2.34. In the example, vehicle 34 moved (despite 1 percent probability) to sensor B, so that *B34 leads to state S2; later *C34 leads to S3 (final) and signal 134 (this time from resource 102) indicates pattern recognition.

It is convenient that resource 102 is—in comparison to resource 101—the resource that is optimized for longer waiting: For example, resource 102 can be implemented by relatively "cheaper" memory, or can be connected to stream 160 in a more optimized fashion to receive only the event representations that are not processed by resource 101.

To complete the discussion of the examples, vehicle 44 passes sensor A and moves to sensor D only. *A44 leads to S1 in instance 1.44 that is processed in resource 101; *D34 leads to S4 so that instance 1.44 is shifted to resource 102 where it remains as instance 2.34 until the time Tmax is reached. Optionally, signal 144 indicates that the pattern was not recognized, or that in the pattern recognition failed for this example too. But with a relatively "cheaper" implementation of resource 102, the uncompleted instance 2.34 causes less overall costs.

To generalize the discussion, most instances are being executed by a first resource (e.g., 101) and completed (to a final state) long before the time window (Tmax) closes. Instances with a low probability of completion (to a final state) are conditionally shifted to a resource (e.g. 102) that is more suitable for processing instances that use the time window for all the time.

FIG. 3 is a flowchart diagram of a method that is performed by a computer system, for example by computer 100 (of FIG. 1) with processing resources 101 and 102.

Computer-implemented method 300 is a method for recognizing an event pattern (e.g., ABC) for objects (e.g. vehicles, 24, 34, 44) that belong to an event domain (e.g., 150 in FIG. 1). The method (300) comprises: activating 310 pattern query 110 with at least one distinctive state transition probability (P(S2 /S4)) that is derived from object observations in the event domain, continuously receiving 320 event representations, allocating 330 the event representations to first processing resource 101 to initiate instances of the query, monitoring 340 the instances and shifting 342 instances to a different resource upon receiving event representations that cause the instances to reach the state with the distinctive transition probability, and—optionally—indicating 350 the recognition of an event pattern.

More in detail, in activating 310, a query (e.g., 110/210 in FIGS. 1-2), the computer activates a pattern query that corresponds to the event pattern (ABC). The query has states (e.g., S1, S2, S3, S4) and event-driven state transitions (S1/S2, S2/S3, S1/S4, S4/S2 , cf. FIG. 2). Transition probabilities (P(S1/S2), P(S2/S3), P(S1/S4), P(S4/S2)) classify the states into a first group (201) of states (e.g., S1, S2, S3) and a second group (202) of states (e.g., S4). The transition probabilities are derived from object observations in the event domain (150).

The processing resources continuously receive 320 event representations (e.g., *A14, *A24, *A44, *D44, . . . ) that are related to the objects (e.g., 14, 24, 34, 44). The event representations have object identifiers (e.g., *14, *24, *34, *44).

Separate for different object identifiers (e.g., *14, *24, *34, *44), the computer allocates 330 the event representations (*A14, *A24, *A44, *D44, . . . ) to a first processing resource (e.g. 101) and thereby initiates 331 first instances (e.g., 1.14, 1.24, 1.34, 1.44) of the query so that the first processing resource executes 332 the first instances with state transitions (e.g., S1/S2 for 1.14, S1/S2 and S2/S3 for 1.24, S1/S4 and S4/S2 and S2/S3 for 1.34, S1/S4 for 1.44).

The computer monitors 340 the first instances (1.14, 1.24, 1.44) according to the classification of the states. For instances that reach states of the first group (201, S1, S2, S3), the computer continues to execute (332) the first instances (e.g., 1.14, 1.24) by the first processing resource (101), but for first instances (e.g., 1.34, 1.44) that reach states of the second group (202, S4), the computer shifts 341 the first instances (e.g., 1.34, 1.44) to a second processing resource (e.g., 102) so that executing continues as second instances (2.34, 2.44).

The computer indicates 350 the recognition of an event pattern (e.g., ABC, by signals 124; 134) for a particular object (e.g., 24; 34) when the first processing resource executes (332) a first instance (e.g., 1.24) to a final state (e.g., S3); or when the second processing resource executes 333 a second instance (1.34) to the final state (e.g., S3).

In an exemplary implementation, method 300 is applied to objects (e.g., 14, 24, 34, 44) that interact with sensors (e.g., A, B, C, D) so that the event representations (*A*14, *B*14 . . . *D*44) are received from the sensors (A, B, C, D).

In an exemplary implementation, in method 300, the sensors submit representations (e.g., *tA, *tB, *tC) of the event time (e.g., tA, tB, tC). The representations are then taking into account at the processing resources, instances that are over time (e.g., active for more than Tmax) can be cancelled. That measure contributes to memory management, reduces the risk of memory overflow, and may also save CPU resources.

In an exemplary implementation, method 300 is executed for events that occur at separate event times (e.g., tA, tB, tC).

In an exemplary implementation, method 300 is executed to recognize event patterns (ABC) that are sequences of events (e.g., tA<tB<tC). The sequentially of events is not required, it is also possible to define event pattern as state machines, without the sequential character. For example, a pattern of interest could be to recognize A, B and C events in any order, or to recognize other logical combinations (e.g., A or B first, C second).

In an exemplary implementation, in method 300, executing the instances stops upon reaching a maximum time (Tmax) since the first state transition. As mentioned that helps to reduce the risk of memory overflow.

In an exemplary implementation, method 300 takes advantage of data that is being processed. For example, during receiving 320 event representations (e.g., *A*14, *B*14 . . . *D*44) or at other occasions, the transition probabilities can be re-calculated 321, and the states can be re-classified 322 into groups 201, 202 with different state. Monitoring 340 can comprise to use the re-classified states. Details for that approach are outlined in connection with the discussion of FIG. 4.

In an exemplary implementation, method 300 is executed with monitoring 340 that monitors the second instances (e.g., 2.34, 2.44) according to the classification of the states. For instances that reach states of the first group (201, S1, S2, S3), the second instances (e.g., 2.34, 2.44) are re-shifted 343 to the first processing resource 101 so that executing continues as first instances. In other words, the instances can be shifted to and from resources, so that the most suitable resource can be used.

In an exemplary implementation, method 300 is executed 332 such that the probability of advancing to a successor state (/S) is larger for states in the first group of states (e.g., S1, S2, S3) than in states in the second group of states (e.g., S4). Looking at FIG. 2, it is more probable that state transit from state shown at the top (group 201) to the state (S4) shown below.

In an exemplary implementation of method 300, the query is activated 310 such that in the second group of states (S4) is not associated with the event pattern (ABC). In the example, state S4 is associates with sensor D, but the pattern excludes that sensor. Sensor D (and state S4) are nevertheless included in the query, because the observations of the domain showed that vehicles relatively seldom return from sensor D to sensor B.

In an exemplary implementation of method 300, the query (110) is activated (310) in combination with an event relation model in that most of the transition probabilities (P(S1/S2), P(S2/S3), P(S1/S4)) for a state that belongs to the first group (S1, S2, S3) to a state that belongs to the second group (S4) are different than the transition probabilities (P(S4/S2) for the state that belongs to the second group (S4) to the states that belongs to the first group (S1, S2, S3).

In the example, the different transitions are—as explained in connection with FIG. 2—such that the transition probabilities P(S1/S2), P(S2/S3), P(S1/S4) are higher than the transition probability P(S4/S2).

Figure 4:
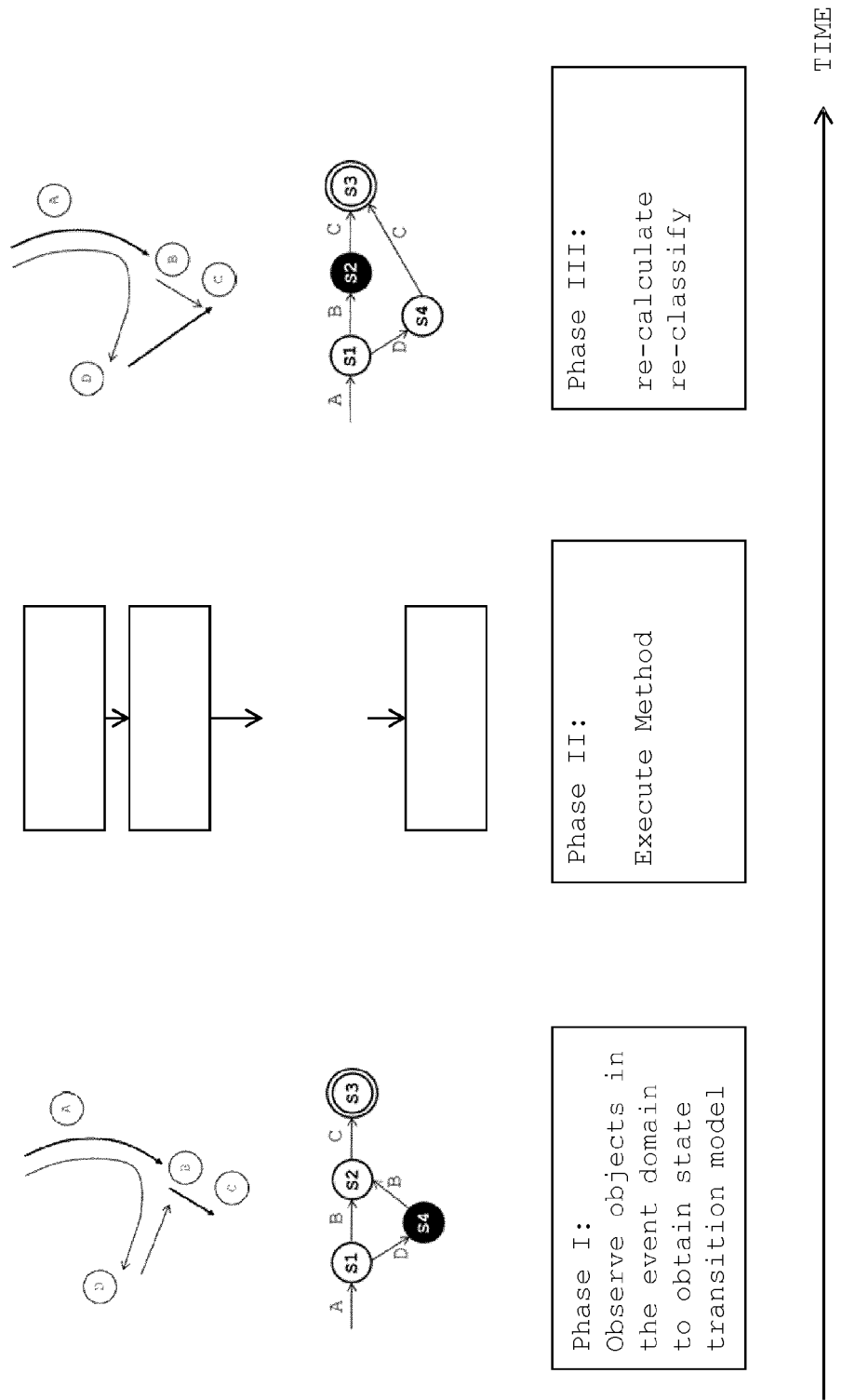
FIG. 4 is an overview diagram to put the method into a broader context.

FIG. 4 is an overview diagram to put the method into a broader context. From left to right, blocks indicate phases. In phase I, objects in the event domain are being observed to obtain state transition model with probabilities (cf. FIG. 2); in phase II, the method is being executed. As a side-effect, new probabilities can be calculated by evaluating the data stream, in phase III so that the re-calculated probabilities can re-classify the states. In example, state S4 was initially taken as a state in the second group; the probabilities have changed over time so that S4 in phase III, S4 is a state of the first group, but state S2 has become a low-leave probability state.

In the above example, with sensor D being located at the sports facility, the probabilities can shift during the day when more an more vehicles go to the stadium.

Figure 5:
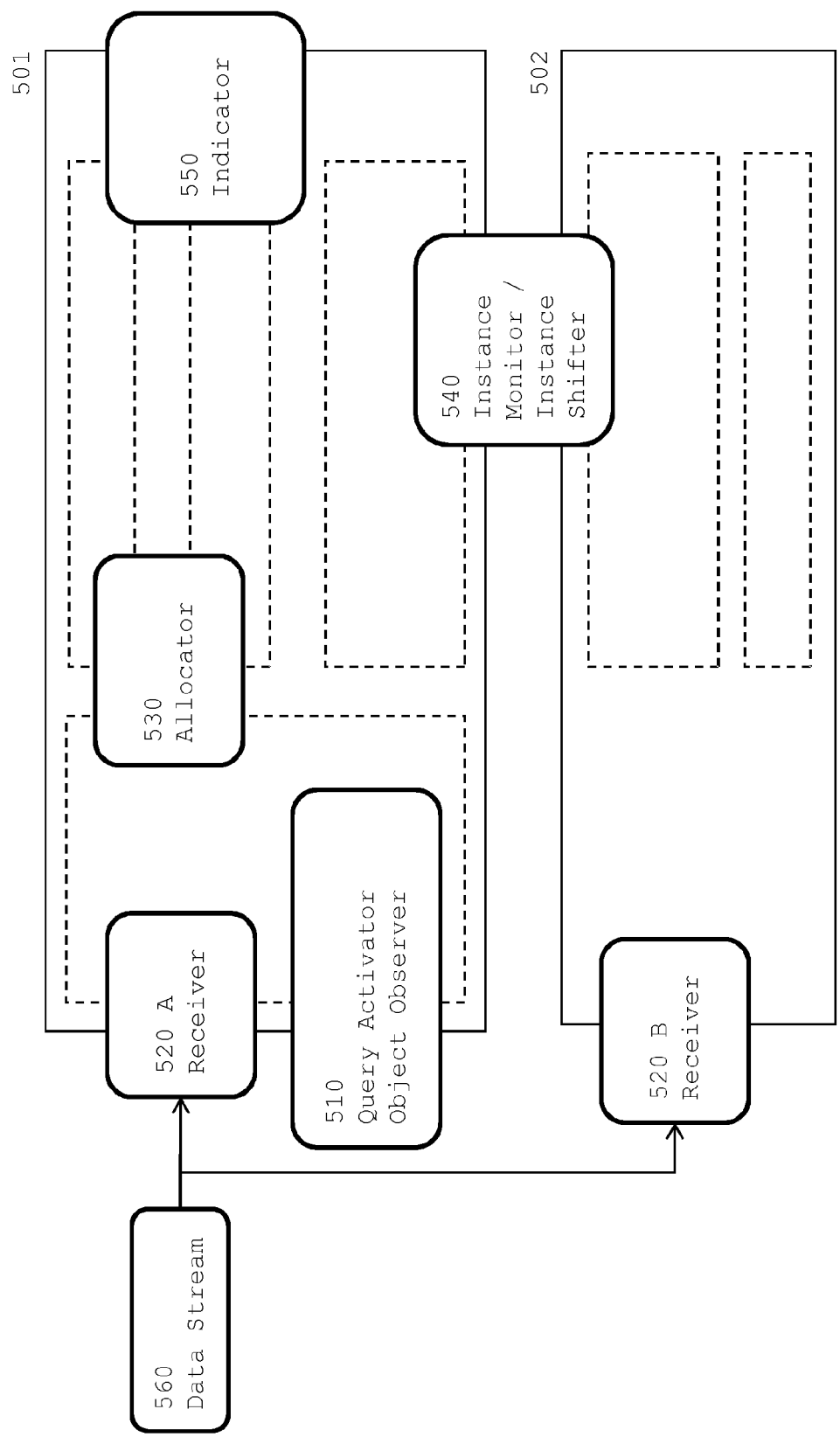
FIG. 5 is a simplified block diagram of the computer of FIG. 1 with more details.

FIG. 5 is a simplified block diagram of computer 500 (cf. 100 in FIG. 1) with more details. For convenience, some elements of FIG. 1 are repeated by dashed lines (data stream 560, resources 501/502 and instances inside the resources) and the computer elements are illustrated above.

Computer 500 for recognizing event patterns (ABC) for objects (14, 24, 34, 44) that belong to an event domain (150) comprises: query activator and object observer 510, receiver 520 A (at resource 501) and receiver 520 B (at resource 502), allocator 530, instance monitor and instance shifter 540, and indicator 550.

In general, in computer 500, the components have the following functions: pattern query activator 510 corresponds to the event pattern (ABC) and activates pattern query 110. As explained in connection with FIG. 2, query 110 has at least one state (e.g., S4) with a distinctive transition probability (P(S4/S2)). The probability (P(S4/S2)) is derived from object observations in the event domain (150). Receiver 520 continuously receives 320 event representations (e.g., *A14, *A24, *A44, *D44, . . . ), that are related to the objects (e.g., 14, 24, 34, 44). Allocator 530 allocates the event representations (e.g., *A14, *A24, *A44, *D44, . . . ) to first processing resource 501 (of computer 500) to initiate 331 instances (1.14, 1.24, 1.34, 1.44) of query 110. Monitor 540 monitors 340 the instances and, upon receiving event representations that causes the instances to reach the state (S4) with the distinctive transition probability (P(S4/S2)), shifts 342 the instances to second processing resource (102).

More in detail, activator/Observer 510 activates the query that corresponds to the event pattern (the query with states and event-driven state transitions, wherein transition probabilities classify the states into a first group of states and a second group of states, the transition probabilities being derived from object observations in the event domain).

Receivers 520 NB continuously receive event representations (from stream 560) that are related to the objects (the event representations with object identifiers).

Allocator 530—separate for different object identifiers—allocates the event representations to the first processing resource 501 and thereby initiates first instances of the query so that the first processing resource 501 executes the first instances with state transitions.

Monitor/shifter 540 monitors the first instances according to the classification of the states, for instances that reach states of the first group, resource 501 continues to execute the first instances, but for first instances that reach states of the second group, shifter 540 shifts the first instances to processing resource 502 so that executing continues as second instances.

Indicator 550 indicates the recognition of an event pattern for a particular object when the processing resource 501 executes a first instance to a final state; or if processing resource 502 executes a second instance to the final state.

Further modifications and options can be introduced, for example, individual queries can be part of a more complex surveillance approach, in that some of the queries are adapted for instances shifting, some other are not.

Looking inside queries and instances, it might be convenient to shift instances only partly. In an example for such partial instances shift, states that will not be reached any longer like initial states, can be discarded from the first resource, without being transferred to the second resource. In such case, shifter 540 shifts instances only partly.

Allocator 530 can initially allocate the event representations to both resources, for example, allocator 530 could also initiate instances on resource 502 (acting at the first resource). The choice of the resource for initial allocation can made according to a current load status of the resources. Alternating the resource allocation is also optional: in that case, event representations for objects with odd IDs could go to resource 501, event representations for objects with even IDs could go to resource 502 (or vice versa).

Optionally, the operation of shifter 540 could be made dependent on other conditions. If one resource (e.g., 501) is being used only partially (e.g., below a performance threshold), or if the other resource (e.g., 502) is being used for other tasks (or not being available at all), shifting can be stopped. Or, if both resources are being used under approximately similar load conditions, shifting might be deactivated as well.

Optionally, resources can be selected from different hardware. For example, on one hand, resource 501 could be a computer that keeps the instances in its main memory, with the advantage of immediate access, but at relatively high memory costs. On the other hand, resource 502 could be a computer that keeps the instances in hard-disk memory, with the advantage of relatively low memory cost. The relatively slow access would not matter, because of the relatively low number of instances (shifted instances) to be processed that reach the final state.

Having described method and computer for recognizing event patterns (ABC) for objects, with conditionally shifting instances between resources, the description now continues with a discussion of the resource load. As mentioned above, instance shifting allows the load to be balanced among the resources.

Figure 6:
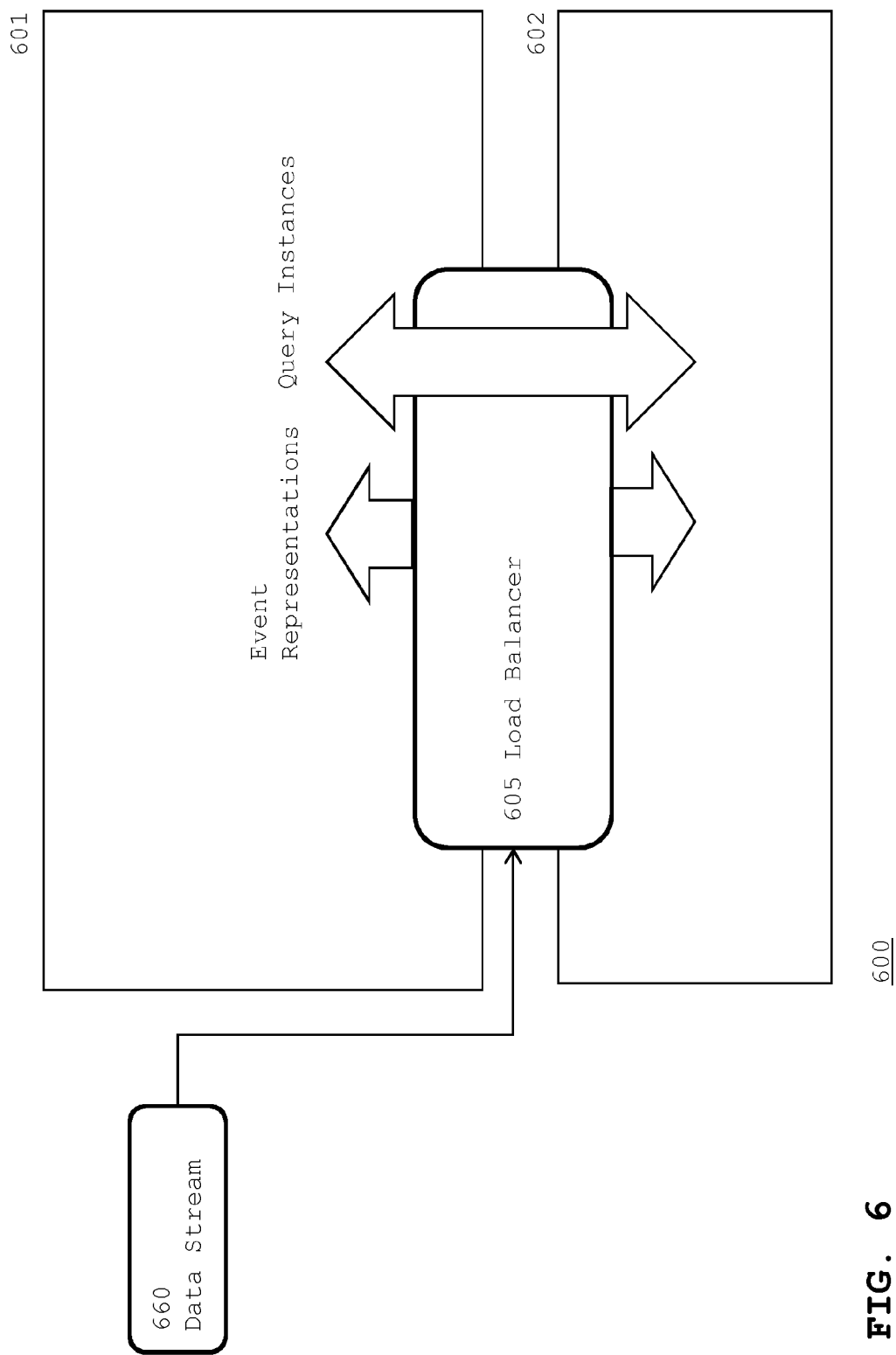
FIG. 6 is a simplified block diagram of computer, with resources and a load balancer.

FIG. 6 is a simplified block diagram of computer 600, with resources 601 and 602 and load balancer 605. Computer 600 can comprise the components of computer 500 (cf. 5). Load balancer 605 performs the method, but it can have extended functionalities. For example, balancer 605 receives data representations from data stream 660 and allocates the representations to the instances. For example, balancer 605 uses a look-up table with object representations, instances and resources. In the example, event representations for objects 14 and 24 (vehicles) would go to resource 601, and event representations for objects 34 and 44 would go to resource 602. Further balancer 605 can trigger the shift of instances (from 601 to 602 or vice versa.)

Balancer 605 can have further functions, as mentioned, for initial allocation, for partial shifting, for load-threshold conditional shifting or the like.

The description now closes with further aspects of a computer program product which is able to perform the above method when run on a computer system and the computer system itself which is configured to run the computer program for executing the method.

In other words, a computer program product that—when loaded into a memory of a computing device (e.g., computer 100/500/600) and being executed by at least one processor of the computing device—performs the steps of the computer-implemented method.

Embodiments of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program, can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The methods described can all be executed by corresponding computer products on the respective devices.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Such storage devices may also provisioned on demand and be accessible through the Internet (Cloud Computing). Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and an input device such as a keyboard, touchscreen or touchpad, a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. Client computers can also be mobile devices, such as smartphones, tablet PCs or any other handheld computing device. The components of the system can be interconnected by any form or medium of digital data communication, e.g., a communication network. Examples of communication networks include a local area network (LAN) and a wide area network (WAN), e.g., the Internet or wireless LAN or telecommunication networks. The computing system can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method for recognizing an event pattern for objects that belong to an event domain, the method comprising:
    activating a pattern query that corresponds to the event pattern and that has at least one state with a distinctive transition probability to reach a final query state, said distinctive transition probability representing a lower transition probability of said at least one state to reach said final state, said lower probability is lower compared to at least one other transition probability to reach said final state of at least one second state, other than said at least one state, the probability being derived from object observations in the event domain; wherein an instance reaching said distinctive transition probability state uses a longer time interval than an instance not reaching said distinctive transition probability state;
    continuously receiving event representations, that are related to the objects;
    allocating the event representations to a first processing resource to initiate instances of the query;
    monitoring the instances and, upon receiving event representations that cause an instance of said instances to reach the state with the distinctive transition probability, shifting the instance to a second processing resource that is more optimized for handling longer time interval than said first processing resource.

2. The method of claim 1, wherein the query is activated such that the state with the distinctive transition probability is not associated with the event pattern.

3. The method of claim 1, wherein
    in activating, the query has states and event-driven state transitions, wherein transition probabilities to the state classify the states into a first group of states and a second group of states, the transition probabilities being derived from object observations in the event domain, and the second group having the at least one state with the distinctive state transition probability;
    in receiving event representations, the event representations are being received with object identifiers;
    in allocating, the event representations to the first processing resource, the event representations are being allocated separately for different object identifiers;
    in monitoring, the instances are being monitored according to the classification of the states, so that instances that reach states of the first group, continue to be executed by the first processing resource.

4. The method of claim 3, wherein monitoring comprises to monitor the shifted instances according to the classification of the states, for shifted instances that reach states of the first group, re-shifting the previously shifted instances to the first processing resource.

5. The method of claim 3, wherein the query is activated in combination with an event relation model in that most of the transition probabilities for a state that belongs to the first group to a state that belongs to the second group are different than the transition probabilities for the state that belongs to the second group to the states that belongs to the first group.

6. The method of claim 1, wherein such method is applied to objects that interact with sensors and the event representations are received from the sensors.

7. The method of claim 1, wherein the sensors submit representations of the event time.

8. The method of claim 1, wherein executing the instances stops upon reaching a maximum time (Tmax).

9. The method of claim 1, wherein receiving event representations comprises to re-calculate transition probabilities and re-classifying the states into groups.

10. The method according to claim 9, wherein monitoring comprisesto use the re-classified states.

11. The method of claim 1, wherein, a computer program product that, when loaded into a non-transitory computer readable memory of a computing device and being executed by at least one processor of the computing device, performs the steps of the computer-implemented method.

12. The method of claim 1, wherein said pattern query has at least one third state with a second distinctive transition probability to reach a final query state, said second distinctive transition probability representing a higher transition probability of said at least one third state to reach said final state, said higher probability is higher compared to at least one other transition probability to reach said final state of at least one fourth state, other than said at least third state, wherein an instance reaching said second distinctive transition probability state uses a shorter time interval than an instance not reaching said second distinctive transition probability state, and
    wherein upon receiving event representations that cause a second instance to reach the third state with the second distinctive transition probability, shifting the second instance to a third processing resource, that is more optimized for handling shorter time interval than said first processing resource.

13. A computer for recognizing an event pattern for objects that belong to an event domain, the computer comprising:
- a pattern query activator that corresponds to the event pattern and that activates a pattern query that has at least one state with a distinctive transition probability to reach a final state of the query, said distinctive transition probability representing a lower transition probability of said at least one state to reach said final state, said lower probability is lower compared to at least one other transition probability to reach said final state of at least one second state, other than said at least one state, the probability being derived from object observations in the event domain, wherein an instance reaching said distinctive transition probability state uses a longer time interval than an instances not reaching said distinctive transition probability state;
- a receiver that continuously receives event representations that are related to the objects;
- an allocator that allocates the event representations to a first processing resource of the computer to initiate instances of the query; and
- a monitor that monitors the instances and, upon receiving event representations that causes an instance of said instances to reach the state with the distinctive transition probability, shifts the instance to a second processing resource of the computer that is more optimized for handling longer time interval than said first processing resource.

14. The computer according to claim 13, wherein the pattern query activator activates a query in that the state with the distinctive transition probability is not associated with the event pattern.

15. The computer according to claim 13, wherein
the pattern query activator uses queries with states and event-driven state transitions, wherein transition probabilities classify the states into a first group of states and a second group of states, the transition probabilities being derived from object observations in the event domain, and the second group having the at least one state with the distinctive state transition probability;
the receiver receives the event representations with object identifiers;
the allocator allocates the event representations separately for different object identifiers; and
the monitor monitors the instances according to the classification of the states, so that instances that reach states of the first group continue to be executed by the first processing resource.

16. The computer according to claim 13, wherein the receiver re-calculates transition probabilities and re-classifies the states into groups.

17. The computer according to claim 13, wherein said pattern query has at least one third state with a second distinctive transition probability to reach a final query state, said second distinctive transition probability representing a higher transition probability of said at least one third state to reach said final state, said higher probability is higher compared to at least one other transition probability to reach said final state of at least one fourth state, other than said at least third state, wherein an instance reaching said second distinctive transition probability state uses a shorter time interval than an instance not reaching said second distinctive transition probability state, and
wherein upon receiving event representations that cause a second instance to reach the third state with the second distinctive transition probability, shifting the second instance to a third processing resource, that is more optimized for handling shorter time interval than said first processing resource.

* * * * *